United States Patent [11] 3,572,490

| [72] | Inventor | Momir Babunovic Des Peres, Mo. |
|---|---|---|
| [21] | Appl. No. | 811,880 |
| [22] | Filed | Apr. 1, 1969 |
| [45] | Patented | Mar. 30, 1971 |
| [73] | Assignee | Barry-Wehmiller Company St. Louis, Mo. |

[54] CONTAINER HANDLING APPARATUS
9 Claims, 8 Drawing Figs.

[52] U.S. Cl. .................................................. 198/22, 198/23
[51] Int. Cl. .................................................. B65g 47/26
[50] Field of Search .......................................... 198/20, 22, 23, 28—30, 34

[56] References Cited
UNITED STATES PATENTS
| 2,547,729 | 4/1951 | Aiken .......................... | 198/22X |
| 2,756,553 | 7/1956 | Ferguson ...................... | 198/30X |
| 2,936,059 | 5/1960 | Hakogi ........................ | 198/20X |
| 3,028,946 | 4/1962 | Krupp ......................... | 198/30X |

*Primary Examiner*—Edward A. Sroka
*Attorney*—Gravely, Lieder & Woodruff

ABSTRACT: Apparatus for handling the transfer of containers from a table top conveyor on which the containers may be in contact with each other to conveyor means having cups or pockets for separating and preventing container contact. There is included apparatus for handling the transfer of containers between table top conveyors moving in different directions through the application of pocketed conveyor means. The apparatus utilizes a container guide on the side of the containers opposite the conveyor cups or pockets, which guide is inclined in the direction of container movement to gradually cause the containers to seat in the cups or pockets.

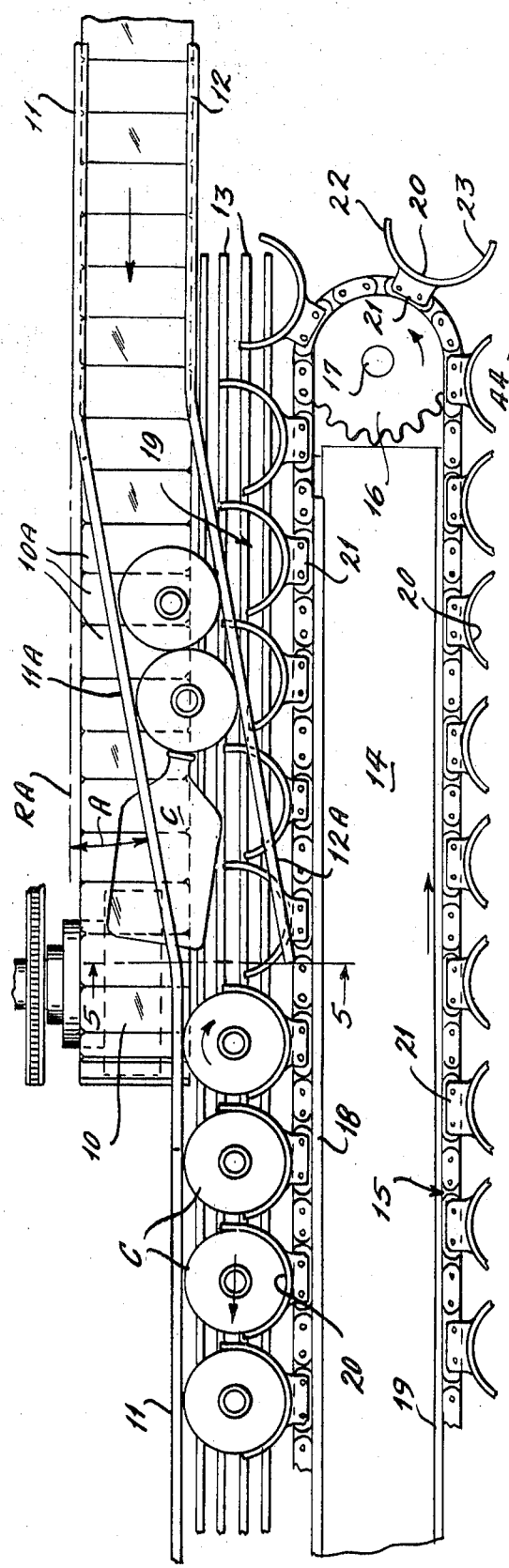
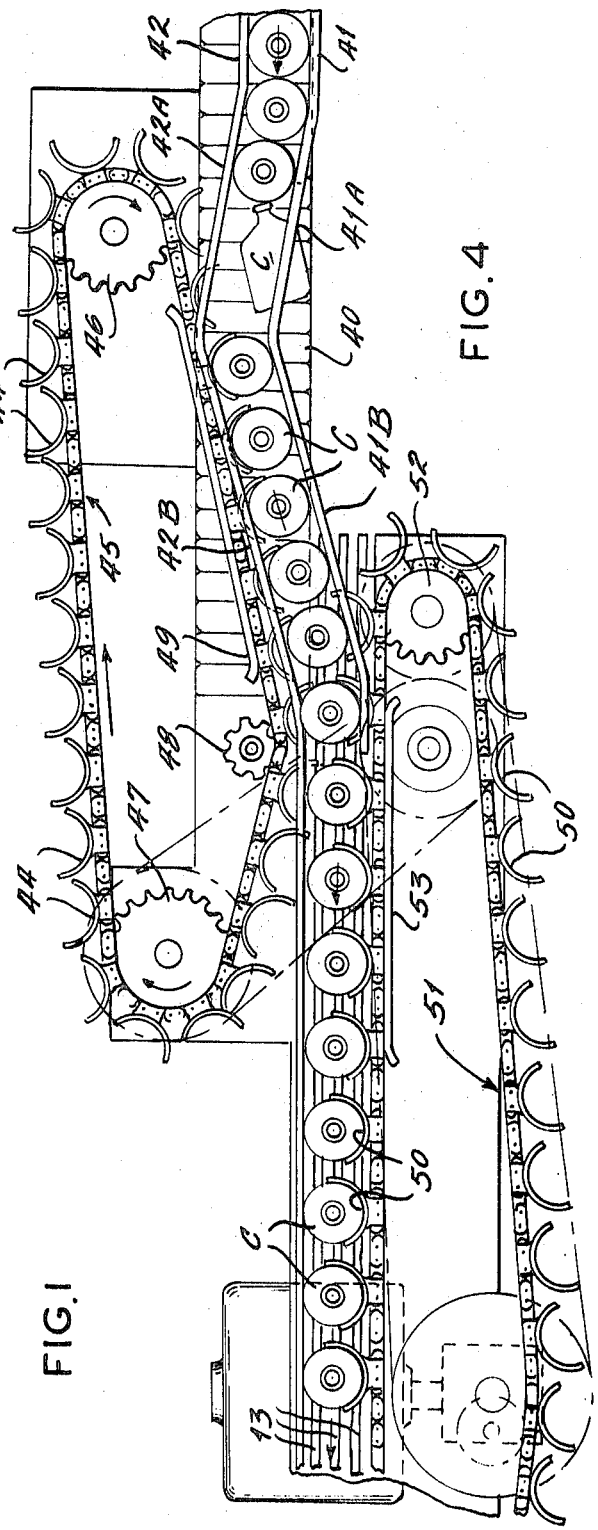
FIG. 1
FIG. 4
INVENTOR:
MOMIR BABUNOVIC
ATTORNEYS.

INVENTOR:
MOMIR BABUNOVIC

INVENTOR:
MOMIR BABUNOVIC

BY

Gravely, Lieder & Woodruff

ATTORNEYS.

INVENTOR:
MOMIR BABUNOVIC

ATTORNEYS.

CONTAINER HANDLING APPARATUS

BACKGROUND OF THE INVENTION

This invention relates to apparatus by which containers may be transferred from a random or a mass flow thereof into an orderly separated flow at speeds considerably higher than may now be attained.

The transfer of containers from a table top conveyor to a pocketed-type conveyor is normally at present accomplished by the use of a star wheel which is synchronized with the speed of the pocketed conveyor so that only one container is released into each pocket as it passes the star wheel. It is well known that this way of transferring or feeding containers operates most satisfactorily so long as there is maintained a full, unbroken supply line of containers on the upstream side of the star wheel. If there is any stoppage on the upstream side so that containers arrive at the star wheel singly or in a random flow, the apparatus will usually jam up. Handling frangible containers in this way causes losses from breakage and downtime of the apparatus. The single or random flow is detrimental because the containers will not thread or feed properly into the star wheel.

In some apparatus a screw device is used in place of a star wheel to overcome some of the problems. A screw feed device is notoriously limited as to speed and lacks the ability to handle a variety of container sizes.

BRIEF SUMMARY OF THE INVENTION

This invention employs the principle of having a first conveyor feed containers into a zone for transferring containers into the cups or pockets of a second conveyor by arranging an inclined guide opposite the pockets to urge the containers into the pockets within a short distance of pocket travel, and to use the trailing surfaces or the pockets as flow control means to segregate the containers sufficiently to obtain proper registry of containers and pockets. The inclined guide acts to sweep the containers laterally into the pockets, and the pockets are suitably guided to limit the movement or flexing of the conveyor chain under feed pressure from the incoming containers. The apparatus of this invention is fabricated so that the leading surface of one pocket engages or is very close to the trailing surface of the next pocket ahead, and the combination of an inclined guide and the arrangement of leading and trailing pocket surfaces has the good effect of restricting or substantially eliminating undesired flexing of the conveyor chain in the area of transfer where container handling is critical.

Included in the invention are means to improve the transfer of containers between angularly related flat top conveyors so that jamming is substantially eliminated as when a container topples and chokes the system. In this regard the apparatus is rendered self-clearing so stoppage is significantly reduced.

This invention is especially useful for transferring containers varying in diameter from 2⅜ inches to 2½ inches into 2¾-inch pockets, or for transferring containers varying in diameter from 2⅝ inches to 2⅞ inches into 3-inch pockets. With variations of this apparatus containers having the first-mentioned diameter variations may be transferred in stages from the smaller pockets to the larger pockets with assurance that the containers will not be crowded two to a pocket because of the segregating action of the leading and trailing surfaces of the pockets.

BRIEF DESCRIPTION OF THE DRAWINGS

The apparatus of this invention may have several arrangements, the presently preferred arrangements being shown in the drawings, wherein:

FIG. 1 is a fragmentary plan view of apparatus for transferring containers moved by a table top conveyor in a free state to a pocketed conveyor moving in the same direction and substantially parallel to the table top conveyor;

FIG. 4 is a further fragmentary plan view of apparatus for transferring containers of small diameter into pockets of large size through the intermediate stage of a conveyor having intermediate size pockets;

DESCRIPTION OF A PREFERRED APPARATUS

In the following description of the several embodiments of presently preferred apparatus it is to be understood that only the essential structure will be included. Supporting structure, frame parts, drive means and other parts and components that are usually found in the conveyor art will be presumed to be included in actual apparatus, but will not be shown in detail so as to reduce the need to describe that which is understood by those skilled in this art. Also the term cup or pocket may be used to describe the means for engaging containers in separated fashion.

Figure 5:
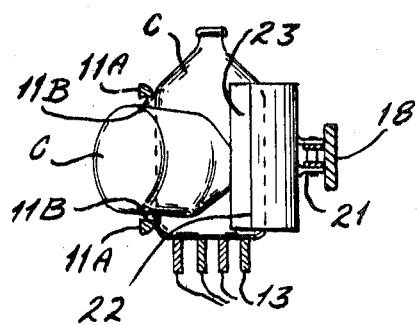
FIG. 5 is a fragmentary sectional elevational view taken at line 5-5 in FIG. 1 showing the means for clearing fallen containers.

The principle of the invention is illustrated in FIG. 1, and reference will be directed to it. A table top conveyor 10 is arranged to bring containers C in a flow between side guide rails 11 and 12. The rails 11 and 12 are arranged in vertically spaced pairs (FIG. 5). Parallel to the conveyor 10 there is arranged a plurality of support rails 13 which are at the same elevation with the top of the conveyor 10. A chain conveyor supporting frame 14 is adapted to support the longitudinal passes of the conveyor chain 15 made up of a plurality of links which mesh with a sprocket wheel 16 mounted on a vertical shaft 17. The chain links are prevented from undulating or flexing by fixed stabilizers 18 on the loading pass and by a guide 19 on the idle pass.

The chain conveyor is provided with container receiving pockets 20, each mounted by a suitable bracket 21 on alternate chain links. The pockets 20 are not symmetrically attached, but have a leading surface 22 that does not project out from the pitch line of the chain as far as the trailing surface 23. In this attachment of the pockets, it can be seen that as they travel along the stabilizer 18, the leading surfaces 22 are either in contact with or are closely adjacent the trailing surfaces 23. This allows the pockets to maintain positions that are relatively free of oscillations and bucking, and it also places the trailing surfaces 23 in such positions that they act to prevent containers crowding two to a pocket.

In the arrangement of the table top conveyor 10 and the conveyor chain 15 with the pockets 20 moving alongside each other, and in the same direction, the guide rails 11 and 12 are formed with angularly directed portions 11A and 12A which direct the flow of container C laterally from the conveyor 10 onto the supporting grid bars 13 and into the path of travel of pockets 20. The rail portions 11A and 12A may vary from the straight reference axis RA by an angle A which varies from about 5° to 15°. The most convenient angle A, the angle A that accomplishes the desired results, is about 6° or 7°, but the angle may vary between from about 5° to as much as about 15°.

OPERATION OF THE APPARATUS

The apparatus of FIG. 1 may be used to handle containers, either glass or plastic bottles or cans, in which the chain conveyor 15 is run at up to about 800 containers per minute and the table top conveyor 10 is run at about 35 percent faster rate which means it is run to move about 1,000 to 1,100 containers per minute. The higher speed of the conveyor 10 is needed to be certain that containers arriving at the transfer zone, defined by the angular portions 11A and 12A of the guide rails 11 and 12, will positively transfer from the table top surfaces 10A onto the grid bars 13 where each container will be picked up by an arriving pocket 20 and be firmly captured between the conveyor pocket 20 and the opposed guide rail portion 11A. It is appreciated that the higher speed of conveyor 10 will result in the table top surfaces 10A sliding under the container bottoms and continuously exerting a forward pressure thereon. When the containers, either singly or in a mass flow, reach the guide rail 11A they will tend to roll or spin about the vertical axes which is a desired action.

Should an arriving container C be positioned so as not to directly enter any pocket 20, the end of surface 23 will push it against the opposed guide rail portion 11A. The result of this action is that the container will be slowed up in its advancing movement sufficiently to mesh with the next following pocket 20. If two containers try to crowd into the same pocket 20, the trailing one of these containers will be prodded by the end of the pocket surface 23 against the opposed guide rail 11A. Again the unwanted container will be slowed down and caused to enter the next following pocket. The difference in speeds of the conveyors 10 and 15, and the action of the angular guide rail 11A on the containers, assures the continuous transfer of containers from a state where they are in engagement or container-to-container abutment to a state where each container is captured in a pocket and separated from the others. Once the containers have been placed in separate pockets they are conditioned to be moved into high-speed apparatus which can handle 1,200 to 2,000 containers per minute.

The conveyor chain 15 is provided with the stabilizer means 18 so that the links will not yield under pressure of the container flow and move back into an arc configuration. Thus containers cannot become stuck on dead center off the end of a pocket surface 23. However, the means 18 will not prevent a certain degree of freedom of the chain links to allow the pockets 20 to rock fore and aft and clear the path for containers to advance into the pockets 20.

Referring to FIGS. 1 and 5, there is seen means by which a fallen container C may be cleared from the path of other containers. The angularly directed rails 11A are flattened or cut away at 11B from a location beginning where the angular portion starts over conveyor 10 to a location slightly beyond the end of conveyor 10. The cutaway portions 11B provide a vertical gap space larger than the diameter of the containers so a fallen container may easily pass through the gap space. When a container C topples it will be carried along by conveyor 10 into the path of travel of the pockets 20 where a pocket surface 22 or 23 is able to contact the container and force it to roll through the gap space and clear the path for the following containers.

The foregoing described means is incorporated in the various forms of the apparatus shown in other drawing views, but no further description is believed necessary.

DESCRIPTION OF MODIFIED APPARATUS

Figure 2:
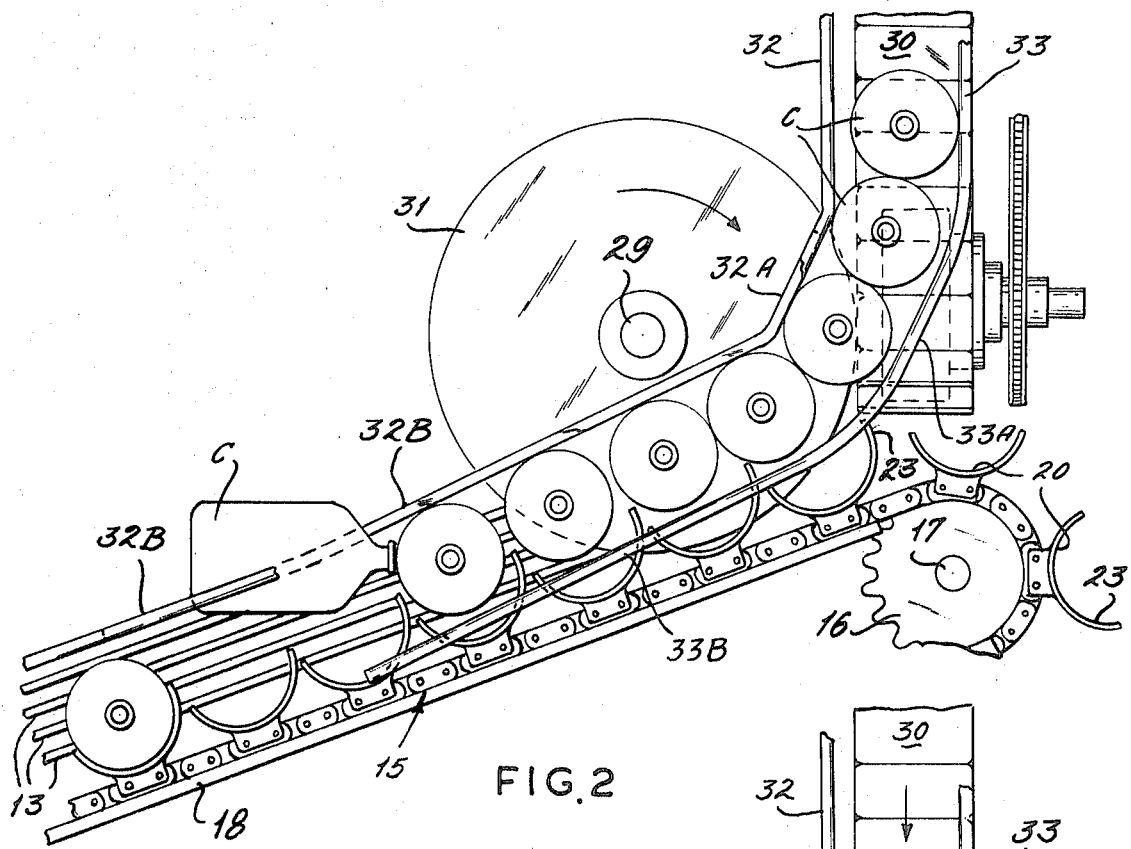
FIG. 2 is a fragmentary plan view of apparatus for transferring containers between a table top conveyor and a pocketed conveyor movable in paths that are angularly related, the apparatus employing a rotating corner plate.

In FIG. 2 there is seen apparatus in which the flat table top conveyor 30 is directed at an angle to the chain conveyor 15, whereby the container flow is forced to negotiate a corner or change of direction. However, once the corner has been negotiated the apparatus is equivalent in arrangement and operation to that shown and described in FIG. 1.

The corner turn in FIG. 2 is accomplished by locating a rotary disc or table 31 on a vertical shaft 29 with its top surface in the plane of the conveyor 30 so as to bridge the gap between the conveyor 30 and the beginning ends of the grid bars 13. The vertically spaced guide rails 32 are formed with an angular section 32A before they become guide rails 32B in the transfer zone. The cooperating guide rails 33 also have an angular section 33A which is substantially parallel to the rail section 32A, and the final sections of the rails 33 are formed by the portion 33B. The rails 32 and 33 guide the containers C off the conveyor 30 and across the margin of the rotary table 31 where the rails 32B forces the containers to enter the pockets 20 of the conveyor 15. The rotary table 31 is suitably driven at a speed to move containers at about the same rate as the conveyor 30 delivers the containers to the corner.

Figure 3:
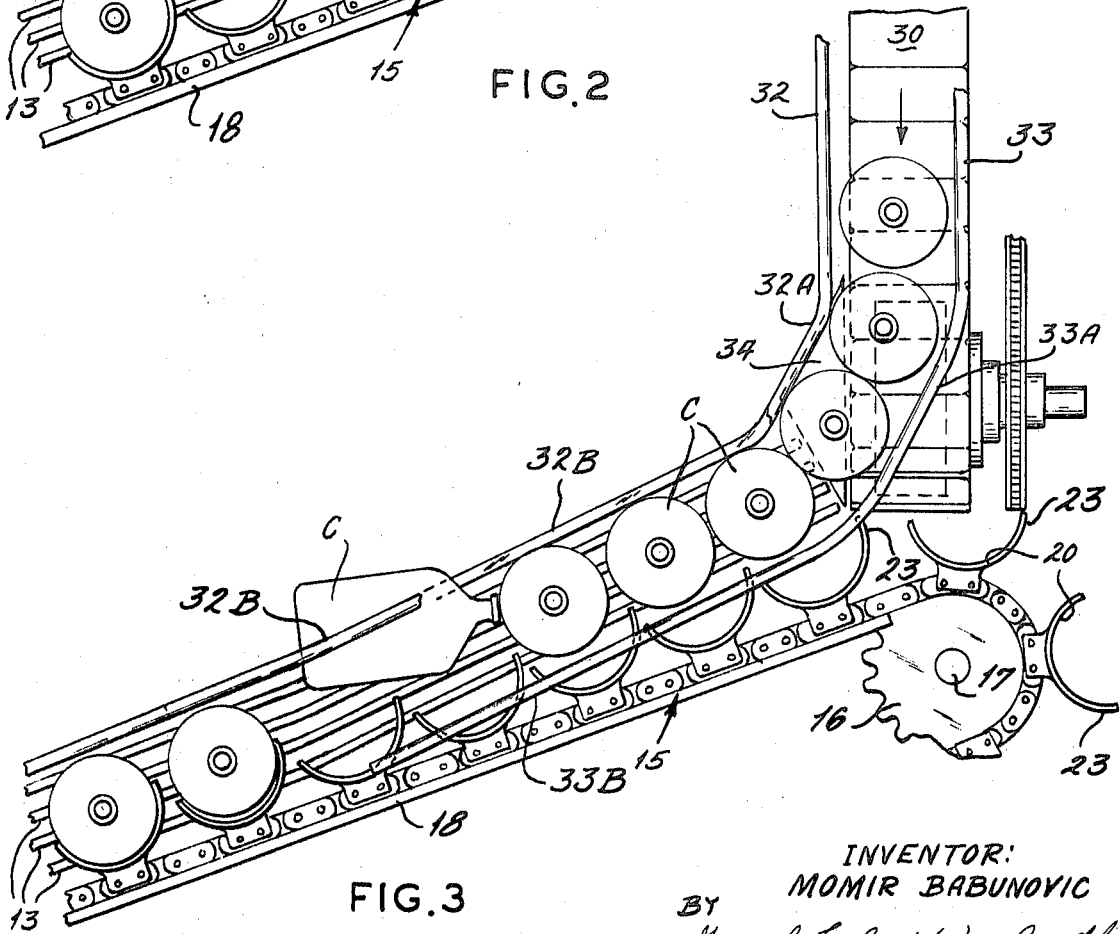
FIG. 3 is a fragmentary plan view of apparatus that is similar to that of FIG. 2, but employing a dead plate in the area of directional change and cooperating support bars.

In FIG. 3, the apparatus is substantially like that in FIG. 2 and the same reference characters will be used wherever possible. The variation here is that a dead plate 34 is substituted for the rotary table 31, and the support rails 13 are extended toward the end of conveyor 30 so as to provide support for the bottom of the containers guided between the rail portions 32B and 33B. The operation of the apparatus of FIG. 3 is the same as that disclosed in FIG. 1, once the containers have negotiated the corner represented by the dead plate 34. In this structure, a single container would tend to stop at the dead plate 34 until subsequent containers pushed it along and into the reach of the longer trailing surface 23 of a pocket 20.

The apparatus of FIG. 4 is directed to the transfer of containers from a tabletop conveyor to the final pocketed conveyor, where small size containers are to be put into large size pockets. The transfer is accomplished in two steps, as will appear hereinafter.

The containers C are conveyed on a tabletop conveyor 40 between vertically spaced pairs of side guide rails 41 and 42. The conveyor 40 approaches the first pocketed conveyor 45 at a low angle of incidence, and the guide rails 41 and 42 are directed at about 6° to 7° to the line of movement of pockets 44 on the chain conveyor 45. The conveyor 45 is trained about spaced sprockets 46 and 47, and also about an idler sprocket 48. A conveyor chain stabilizer means 49 is disposed to support the chain in its working pass from sprocket 46 to idler sprocket 48.

The operation of the components of apparatus of conveyors 40 and 45 is substantially like that described for the apparatus of FIG. 1.

An object of the apparatus of FIG. 4 is to pass the containers C from the pockets 44 to a series of larger pockets 50 mounted on a conveyor chain 51 trained about an end sprocket 52 and having a container receiving pass defined by the stabilizer means 53. The problem is to place containers in the pockets of conveyor 51 so as to prevent two containers ganging up in one of the pockets 50.

The pockets 44 of conveyor 45 may be placed on 3-inch centers and will smoothly receive containers having diameters of from 2⅜ inches to 3 inches. The transfer directly to pockets 50 which are on 3½inch centers might run into breakage problems when two containers try to get into the same pocket. However, once the containers are placed in the pockets 44, the conveyor 45 may be easily synchronized with the conveyor 51 to register pockets 50 with the pockets 44. A vertically spaced pair of guide rails 41, after providing the inclined portion 41A continue on into section 41B which has a low angle of approach of about 6° to 7° to the conveyor 51. The opposed vertically spaced pair of cooperating rails 42 have inclined portions 42A which continues on in portions 42B directed at a low angle to the conveyor 51.

It is seen that the second transfer of containers from conveyor pockets 44 to the conveyor pockets 50 follows substantially the principle of the apparatus of FIG. 1. The difference is that the conveyor 45 feeding the conveyor 51 is provided with pockets instead of being a tabletop conveyor.

Figure 6:
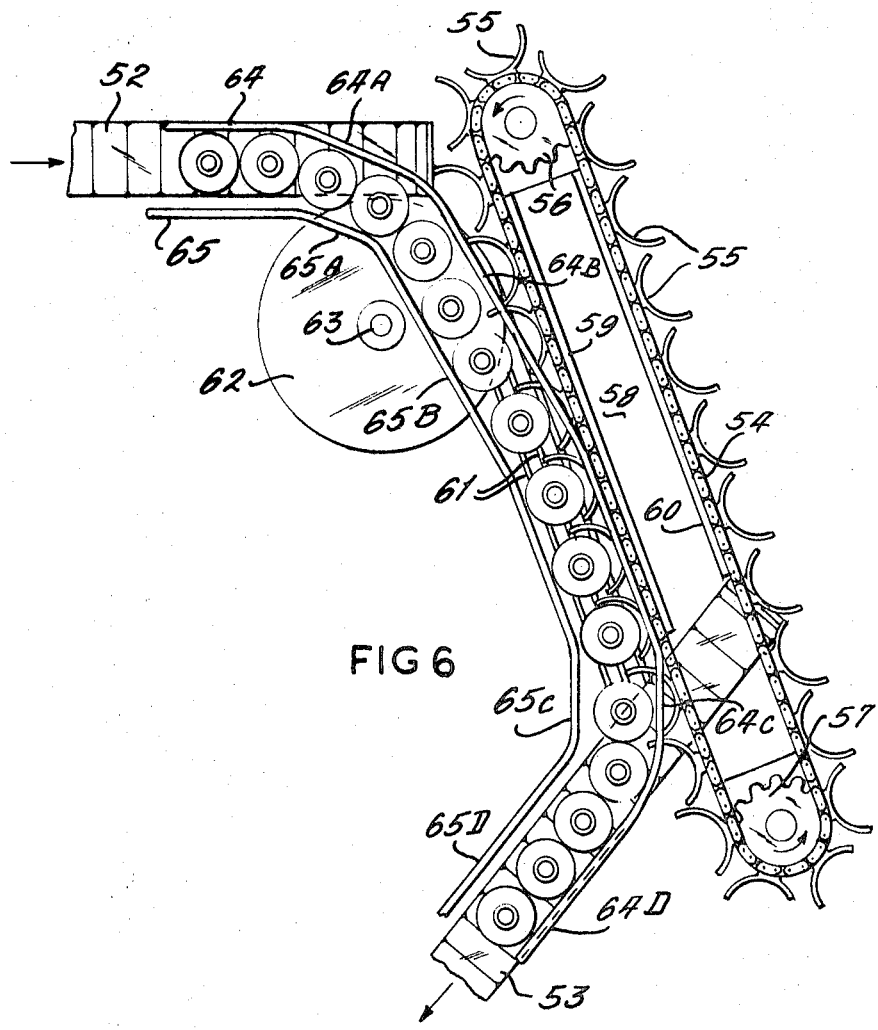
FIG. 6 is a fragmentary plan view of modified apparatus for transferring containers between angularly related table top conveyors.

In FIG. 6 there is seen apparatus which comprises a container feed conveyor 52 of tabletop character, and a discharge tabletop conveyor 53 directed at an angle to the conveyor 52. The transfer from conveyor 52 to conveyor 53 is accomplished by a conveyor chain 54 having pockets 55 mounted on alternate chain links, as in the manner seen in FIG. 1. The conveyor chain 54 is trained about sprockets 56 and 57, and a frame 58 supports chain stabilizer means 59 in the working pass and a guide 60 in the idle pass. The pockets 55 move along in the working pass of the conveyor chain 54 over a series of grid bars 61 which are disposed in the planes of tabletop conveyors 52 and 53.

The transfer out of conveyor 52 is accomplished by disposing a rotary table 62 on a vertical shaft 63 at the corner adjacent the end of conveyor 52. Vertically spaced pairs of guide rails 64 and 65 confine the containers on the runoff end of conveyor. These rails are formed with first angular portions 64A and 65A respectively to guide the containers into the rotary table 62. Subsequent angular portions 64B and 65B directed at angles of about 6° or 7° guide the containers across the margin of rotary table 62 and into the area where pockets 55 pick up the containers, as heretofore set forth in FIG. 1.

As the pocketed containers approach discharge conveyor 53, vertically spaced pairs of angular rail portions 64C and 65C guide the containers out of the respective pockets and onto the tabletop conveyor 53. The guide rail portions 64D and 65D confine the containers to follow the path of movement established by conveyor 53 to complete the transfer.

Figure 7:
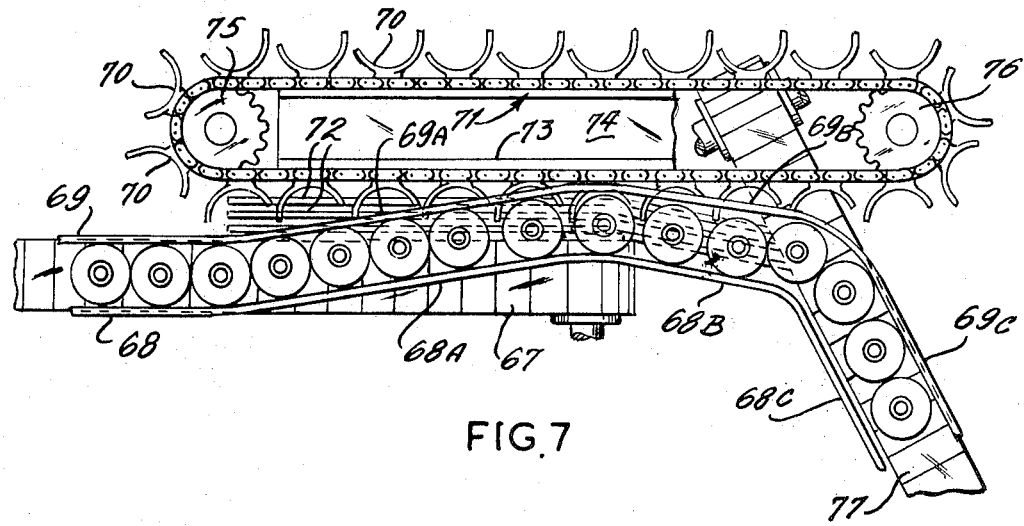
FIG. 7 is a fragmentary plan view of a further modified apparatus operating in accordance with the present principles.

Turning to FIG. 7 the apparatus includes some of the components used in FIG. 1 with some used in FIG. 6. The tabletop conveyor 67 moves the containers C between vertically spaced pairs of guide rails 68 and 69. These rails have angularly directed portions 68A and 69A which cause the containers to approach the pockets 70 of the endless conveyor chain 71 along a slope of about 6° to 7° (as before noted). The containers are supported in the pockets 70 upon a grid of support rails 72 and the conveyor chain 71 is stabilized by a fixed rail 73 carried by a suitable frame 74 in which the sprockets 75 and 76 are mounted.

After the containers are received in the pockets 70 angular portions 68B and 69B of the guide rails sweep the containers out of the pockets and onto the tabletop conveyor 77 over the grid of support rails 72. The guide rails continue on in parallel portions 68C and 69C to follow the conveyor 77.

Figure 8:
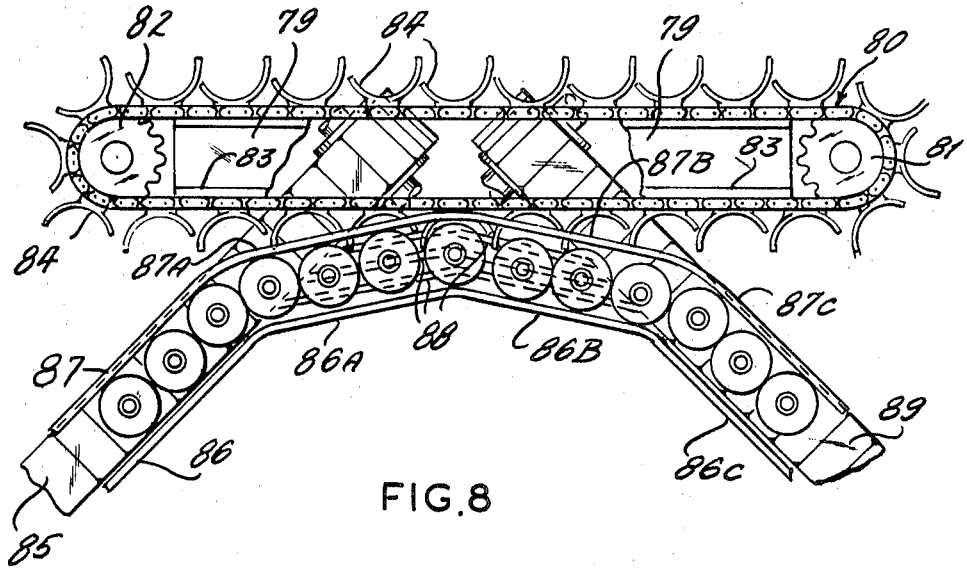
FIG. 8 is a fragmentary plan view of still another modified apparatus following the principle of the invention.

In FIG. 8 a suitable frame 79 is provided for an endless conveyor chain 80 trained over sprockets 81 and 82. The chain is guided by stabilizer 83 and brings successive pockets 84 past the table top feed conveyor 85 on which containers C are brought between vertically spaced guide rails 86 and 87 into a transfer zone where the angularly directed portions 86A and 87A of the guide rails sweep the containers onto the bottom support rails 88. The containers are picked up in pockets 84 and then subsequently removed therefrom by further angular rail portions 86B and 87B. The containers reach the tabletop conveyor 89 which carries them off between guide rails 86C and 87C at some predetermined angle relative to conveyor 85.

I claim:

1. Container-handling apparatus comprising a first linear conveyor supplying containers, a second linear conveyor receiving containers supplied by said first conveyor, pocket means on said second conveyor adapted to receive individual containers from said first conveyor, means operative between said conveyors to support the bottom of the containers moved from said first conveyor into said pocket means of said second conveyor, guide means extending from said first conveyor over said support means and having portions approaching said second conveyor at an angle to the linear travel thereof, a third conveyor having a portion of its path of travel coincident with said angled guide means, and other pocket means on said third conveyor adapted to register with individual containers moved along said angled guide means by said first conveyor and also to register with said pocket means on said second conveyor to move containers in separated condition during handling in said apparatus, said angled portion of said guide means forcing containers into said pocket means and out of said other pocket means.

2. The container-handling apparatus of claim 1 wherein said first and second conveyors are substantially parallel and said support means comprises a plurality of rails over which the container bottoms slide.

3. The container-handling apparatus of claim 1 wherein said angled portions of said guide means approach the line of travel of said second conveyor at an angle of from 5° to 15°.

4. The container-handling apparatus of claim 1 wherein said angled portions of said guide means approach the line of travel of said second conveyor at an angle of about 6° to 7°.

5. The container-handling apparatus of claim 1 wherein said angled portions of said guide means includes a pair of vertically spaced rails in advance of said other pocket means on said third conveyor, said spaced rails cooperating with said first conveyor and being separated by a distance greater than the container diameter to permit a fallen container on said first conveyor to be ejected from the line of travel of following containers.

6. The improvement of claim 1 wherein said first and second conveyors have paths that are substantially parallel, and said angled portions of said guide means is effective to sweep containers laterally from one conveyor to the other.

7. The improvement of claim 1 wherein said pocket means on said second conveyor have trailing surfaces adapted to enter between containers approaching said second conveyor path.

8. The improvement of claim 1 wherein means is disposed along the path of travel of said second and third conveyors to stabilize the positions of said pockets thereon and resist pressure of containers approaching said pockets.

9. The improvement set forth in claim 1 wherein said third conveyor pockets are smaller than said pockets in said second conveyor, whereby containers of a size conforming to said pockets of said second conveyor are transferred to said larger other pockets.